United States Patent [19]
Neff et al.

[11] Patent Number: 6,147,835
[45] Date of Patent: Nov. 14, 2000

[54] FOREIGN OBJECT FOR ELECTRONIC DEVICE DRIVE SLOTS

[76] Inventors: Douglas H. Neff, 26866 No. Claudette St., #712, Canyon Country, Calif. 91351; Gregory L. Woldanski, 27459 Onlee Ave., Saugus, Calif. 91350

[21] Appl. No.: 09/150,514

[22] Filed: Sep. 9, 1998

[51] Int. Cl.[7] .................................. G11B 23/02
[52] U.S. Cl. .................. 360/132; 360/97.04; 360/137
[58] Field of Search ..................... 360/97.01–97.04, 360/99.01, 132, 137

[56] References Cited

U.S. PATENT DOCUMENTS

| | | | |
|---|---|---|---|
| 4,980,785 | 12/1990 | Talmadge | 360/97.02 |
| 5,122,918 | 6/1992 | Chao | 360/133 |
| 5,367,423 | 11/1994 | Phillips | 360/137 |
| 5,530,603 | 6/1996 | Weidman et al. | 360/97.04 |
| 5,626,252 | 5/1997 | Trotman | 220/789 |
| 5,710,688 | 1/1998 | Cihak et al. | 360/137 |
| 5,766,285 | 6/1998 | Killman | 55/385.6 |
| 5,820,236 | 10/1998 | Aoki | 312/223.2 |

*Primary Examiner*—Jefferson Evans
*Attorney, Agent, or Firm*—Terrell P. Lewis

[57] ABSTRACT

A drive slot guard device for the drive slot of an electronic apparatus includes a first planar portion attachable to media cartridge and insertable with the media cartridge into the drive slot of an electronic device, and a second portion for blocking access to the slot when the first portion of the slot guard device has been inserted into the drive slot. The first portion extends normal to and laterally of the second portion. The first portion of the slot guard is preferably secured to a disk or cartridge member that can be secured in the drive slot of the electronic device. The disk or cartridge member can be a functional disk or cartridge or a dummy, non-functional, disk or cartridge.

14 Claims, 2 Drawing Sheets

FOREIGN OBJECT FOR ELECTRONIC DEVICE DRIVE SLOTS

BACKGROUND OF THE INVENTION

1. Field of the Invention

The present invention relates generally to electronic devices, and more particularly to a guard or protector for preventing insertion of foreign objects into the drive slots or openings of electronic devices adapted to read data from media bearing disks or cartridges to be inserted into the drive slots or openings.

2. Description of the Related Art

These days, electronic devices capable of reading and writing data from and onto media bearing cartridges have become commonplace. Examples of such devices include personal computers, video and audio cassette recorders and players, and CD recorders and players.

Electronic devices such as these typically include one or more drive mechanisms for cartridges on which visual or aural media is carried.

Typically, the housing of an electronic device is provided with one or more drive slots or openings for insertion of media bearing cartridges. Insertion of the cartridge into the housing permits engagement of the cartridge with "read" or "write" heads associated with the drive mechanisms in the electronic device.

Typically, when a consumer purchases or otherwise acquires electronic devices of this type, he or she encounters a situation where no protection has been afforded by the manufacturers of such electronic devices for preventing the insertion of objects into the drive slots that should not be placed there. Objects that are improperly inserted in the drive slot would be those that are other than the disks or cartridges that are intended to be used with such electronic devices.

Kids have a habit of exploring openings and crevices, and will not think about consequences of inserting an improper object, for example, a playing card, a toy, or an eating utensil, into the drive slot. Also it is desirable to protect against the introduction of dust Previously, the industry was focused on preventing dust and other foreign airborne substances from entering the drive slots of personal computers to protect the internally housed drive mechanism. However, products resulting from these efforts were useful only when the personal computers were maintained in an "on", operational, state.

For example, FIG. 1 of applicants' drawings shows a disk drive slot dust protector disclosed by U.S. Pat. No. 4,980, 785 to Talmadge. This patent shows a wedge-shaped computer disk drive dust protector which, in use, is tightly wedged in the disk drive slot, thereby preventing the entry of dust into the slot. The dust protector of Talmadge includes a blade portion 18 and a handle portion 14, and the material from which the dust protector is made is a rigid, resilient, rubber-like, plastic material.

FIG. 2 of applicants' drawings shows a disk drive slot dust protector disclosed by U.S. Pat. No. 5,530,603 to Weidman et al. This patent shows a device for preventing air and dust from entering a floppy disk drive on a personal computer. The floppy disk to be inserted into the drive is provided with a compressible and porous dam on the front portion thereof. Upon insertion of the floppy disk into the drive slot of the computer, the dam compresses to conform to the volume of the drive opening. In this way, air as well as dust is blocked from entering the disk drive.

The solution provided by the Talmadge and Weidman et al. patents has not proven successful for several reasons. First, in devices like that taught by Weidman et al., the porous dam quickly becomes dirty and clogged from entrapment of the dust and other airborne particles it is designed to keep out of the drive slot. Second, with either the Weidman et al. or the Talmadge dust protector, after repeated insertions and compressions of the dust protector material, the body of the dust protector breaks down, the free flow of clean air into the drive mechanism, ordinarily required to keep the disk drive motor from overheating while in its "on" operating state, is prevented.

Against this background of known technology, a new drive slot guard has been developed which includes a drive slot blocking portion and an attachment portion. The blocking portion remains outside the drive slot and includes a region that lies flush with the outer surface of the electronic device and covers the drive slot. The blocking portion may include a handle to facilitate extraction. The attachment portion extends laterally away from the blocking portion, and is adapted for insertion into the drive slot. The attachment portion includes an attachment region for securing the attachment portion to a media bearing cartridge. The drive slot guard is designed to be attached to a functional cartridge or a dummy cartridge, the latter being inserted into the cartridge drive slot. Attachment of the slot guard and cartridge may be effected through the use of adhesive bonding materials, transfer adhesive or tape, or mechanical fasteners. The invention also contemplates forming the slot guard unitarily with the cartridge. Release of the slot guard and cartridge combination from the drive slot is effected by ejection of the cartridge from the slot.

OBJECTS AND SUMMARY OF THE INVENTION

It is therefore an object of the present invention to provide a novel guard or protector device for preventing insertion of unwanted objects into the cartridge drive slot of an electronic device, while overcoming all the disadvantages and drawbacks of known guards or protectors.

Another object of the present invention to provide a slot guard having a portion securable in a floppy disk drive to prevent insertion of foreign objects into the drive.

Still another object is to provide a slot insertion blocking device for preventing insertion of objects other than those intended to be introduced into an electronic device, such as a computer, a VCR, a tape player or a CD player.

Yet another object of the invention is to provide a drive slot guard for an electronic device drive slot which includes a portion, attachable to a cartridge, that can be secured with the cartridge in the drive slot to prevent insertion of objects into the slot until the slot guard is removed by ejection of the cartridge.

These and other objects of the present Invention are achieved by the slot guard device of the present invention which includes a first portion attachable to media cartridge and insertable with the media cartridge into the drive slot of an electronic device, and a second portion for blocking access to the slot when the first portion of the slot guard device has been inserted into the drive slot. The second portion may be flexibly or hingedly connected to the first portion. The second portion of the slot guard is preferably secured to a disk or cartridge member that can be secured in the drive slot of the electronic device. The disk or cartridge member can be functional or a dummy.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since only the generic principles of the present invention have been defined herein specifically to provide teachings for a novel drive slot guard that encompasses many long sought after features of electronic device usage of the type described hereinabove more desirable.

Figure 1:
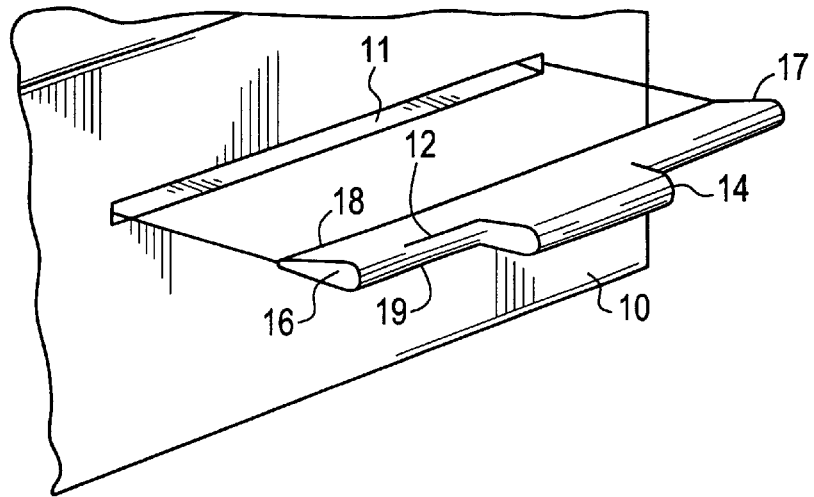
FIGS. 1 and 2 show disk drive slot protector devices for preventing dust and airborne objects from entering the drive mechanisms of personal computers, as shown in U.S. Pat. No. 4,980,785, and U.S. Pat. No. 5,530,603, respectively.
Figure 2:
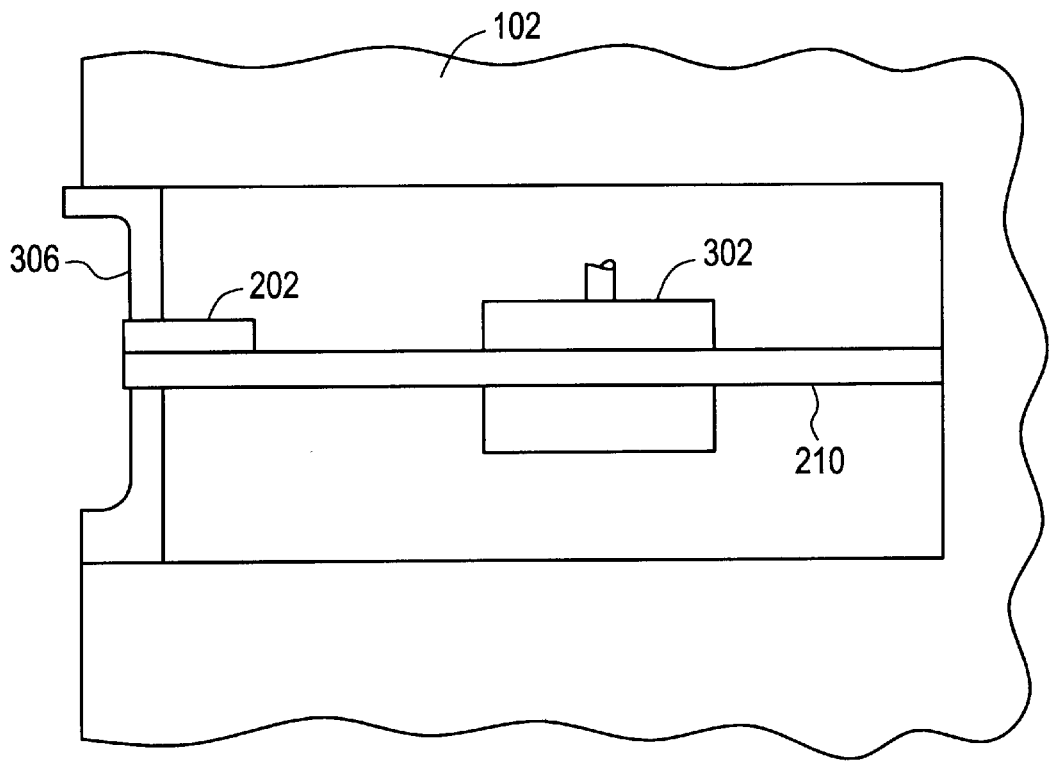
Figure 3:
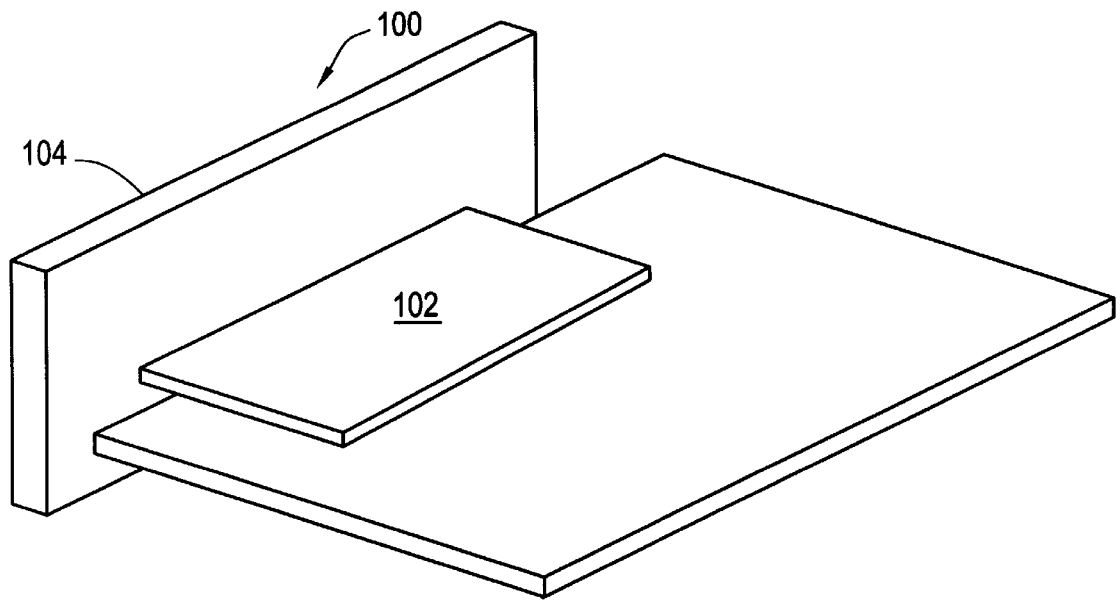
FIGS. 3 and 3a are views of the slot guard in accordance with the present invention.

A preferred embodiment of the slot guard 100 of the present invention is depicted in FIG. 3 of applicants' drawings. The slot guard 100 is shown for use with a floppy disk of a personal computer. However, it is to be understood that the slot guard of the present invention can be used with other media-bearing cartridges or disks, such as VCR cartridges and compact disks.

Referring to FIG. 3, the slot guard of the invention is seen to include an attachment portion 102 and a slot-covering/handle portion 104, having opposing sides which permit gripping the portion 104 for manipulating the slot guard of the invention. The attachment portion preferably comprises an arm that is a thin, plate-like member that extends normal to, and laterally away from, the slot-covering/handle portion 104.

Figure 3A:
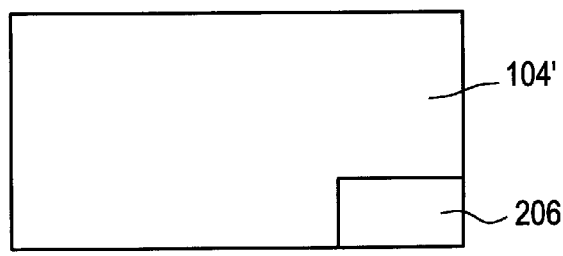

Preferably, and for most applications, the overall configuration of the slot-covering handle portion is rectangular in overall exterior configuration. However, where the electronic device has an ejection control button positioned near the drive slot, as with the floppy disk drive slots of personal computers, a second configuration of the slot covering handle portion, as shown in FIG. 3a at 104', is provided with a small cut-out section 206 located at a lower corner position that corresponds with the location of the ejection control button.

The cut-out section 206 can be provided in the slot-covering handle portion at the time of its manufacture, or at a subsequent time after purchase by the consumer. In the latter case, the slot-covering handle portion can be provided as a thin plate member with a scored square or rectangularly shaped section that will enable removal of the scored section. The scored sections are located at positions that correspond to locations of ejection control buttons or levers of the most popular models of electronic devices where such drive slots are employed.

The arm of the attachment portion may be formed integrally with the slot-covering handle portion or it may be formed as separate member that can be bonded or otherwise secured to the slot-covering handle portion. Preferably, the arm of the attachment portion extends laterally away from a middle region of the slot-covering handle portion.

Figure 4:
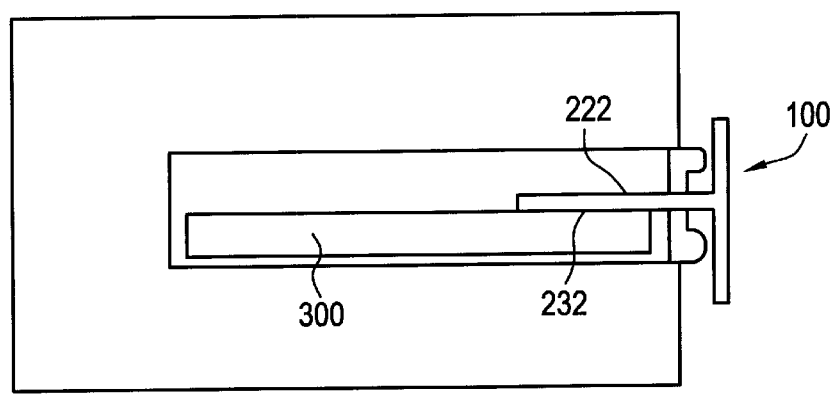
FIG. 4 is a side view of the slot guard of the invention attached to a cartridge member.

As seen in FIG. 4, the arm of the attachment portion is adapted to be secured to a cartridge 300. Preferably, one surface 232 of arm 222 is secured to one surface 302 of the cartridge at an end of the cartridge that is last to be inserted into the electronic device. Attachment of the arm surface 232 to the surface 302 of the cartridge is accomplished by the use of adhesive bonding thermoset or thermoplastic material, transfer adhesive, tape, or mechanical fastener means. Alternatively, the arm of the drive slot blocking portion can be manufactured as an integral part of the cartridge, whether the cartridge is a functional or dummy/non-functional cartridge.

In using the drive slot guard device of the present invention, it would first be necessary to make sure the cartridge and the slot guard device were attached. Then, the cartridge would be inserted in the drive slot of the electronic device, in a manner similar to that required for conventional use of the cartridge. The cartridge will be retained in the drive slot, and the drive slot guard device will be retained in such a manner that the slot blocking handle portion covers the drive slot, due to the interaction of the cartridge with the cartridge retention system in the drive slot of the electronic device.

Those skilled in the art will appreciate that various adoptions and modifications of the invention as described above can be configured without departing from the scope and spirit of the invention. Therefore, it is to be understood that, within the scope of the appended claims, the invention may be practiced other than as specifically described herein.

What is claim is:

1. A guard device for protecting the drive slot of an electronic apparatus against insertion of undesired objects, the guard device comprising:

a first portion comprising a substantially planar plate member; and a second portion comprising means for securely retaining a media bearing cartridge adapted for insertion into, and retention in, the drive slot, the first portion being disposed substantially perpendicular to said second portion for blocking the drive slot of said electronic apparatus, and said first and second portions being solid and non-porous.

2. The guard device of claim 1, wherein said second portion comprises a planar plate member extending laterally away from said first portion, said plate member being laterally large enough to extend into the drive slot.

3. The guard device of claim 2, wherein said second portion further comprises a base portion secured to said planar portion.

4. The guard device of claim 3, wherein said base portion is formed integrally with said plate member.

5. The guard device of claim 4, wherein said base portion is formed integrally with said first portion.

6. The guard device of claim 3, wherein said base portion is formed integrally with said first portion.

7. The guard device of claim 3, wherein said first portion includes a handle portion.

8. Apparatus for preventing insertion of unauthorized objects into a drive slot of an electronic device adapted to receive a media bearing cartridge, said apparatus comprising:

a first portion comprising a substantially planar plate member and adapted to cover a surface of said electronic device adjacent the drive slot;

a second portion disposed substantially normal to said first portion and comprising means for securely retaining a cartridge adapted for insertion into the drive slot;

said first and second portions comprising non-porous material, and a cartridge attached to said second portion and having means for engagement With a cartridge retention mechanism in said electronic device.

9. The apparatus of claim 8, wherein said cartridge is a functional, media-bearing cartridge.

10. The apparatus of claim 9, wherein said cartridge is a floppy disk.

11. The apparatus of claim 8, wherein said cartridge is a non-functional, dummy device that structurally resembles a functional media-bearing cartridge.

12. The apparatus of claim 8, wherein said second portion is adapted to be secured with said cartridge in the drive slot for preventing insertion of objects into the slot until second portion and cartridge are removed from drive slot by ejection of the cartridge from the slot.

13. A device for preventing insertion of unauthorized objects into a drive slot of an electronic device adapted to receive a media bearing cartridge, comprising:

a first plate member adapted to cover a surface of said electronic device adjacent the drive slot;

a second member extending substantially normal to said first member, said first and second portions comprising non-porous material, and a functional media-bearing cartridge attached to said second member and insertable into, and retainable in, the drive slot in the same manner that a functional media-bearing cartridge can be inserted into, and retained in, the slot.

14. The apparatus of claim 13, wherein said second member is adapted to be secured, with said cartridge, in the drive slot for preventing insertion of objects into the slot until the second portion and cartridge, together, are removed from drive slot by ejection of the cartridge from the slot.

* * * * *